Oct. 20, 1942.　　　M. M. TEAGUE　　　2,299,602
DOVETAILING MACHINE
Filed June 17, 1940　　　4 Sheets-Sheet 1
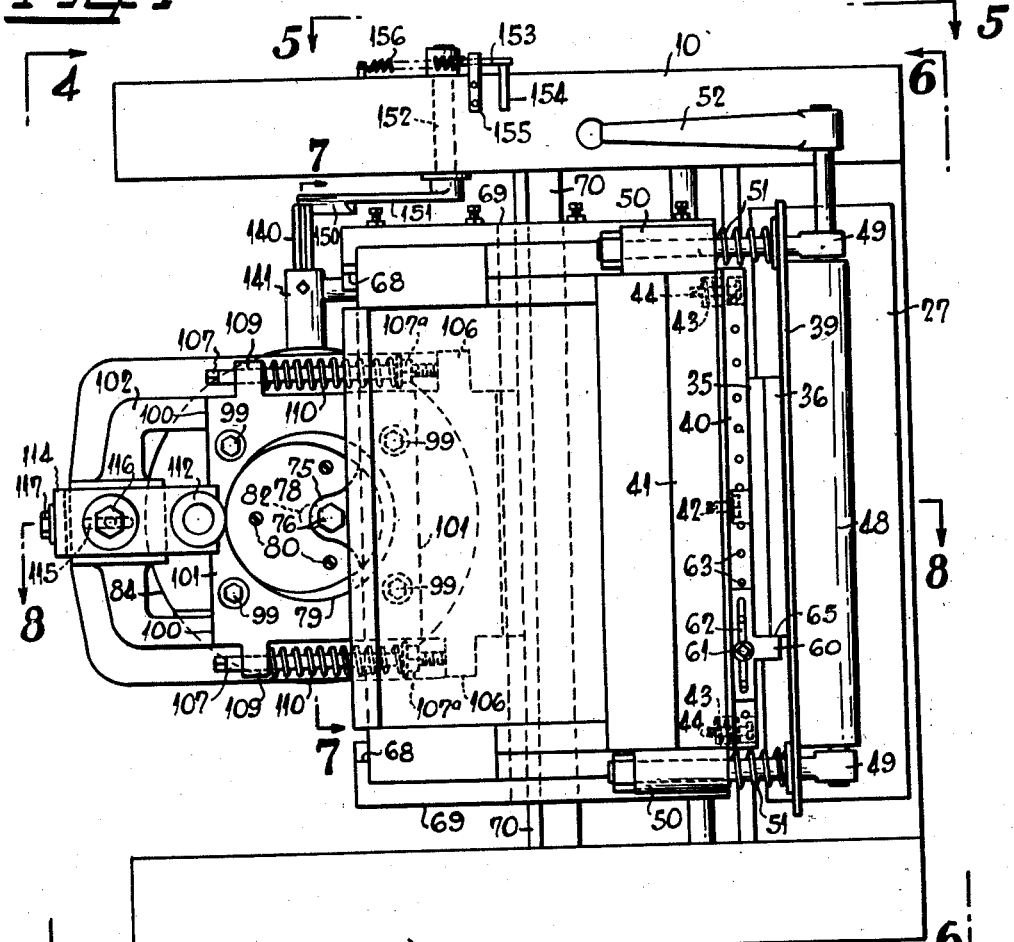
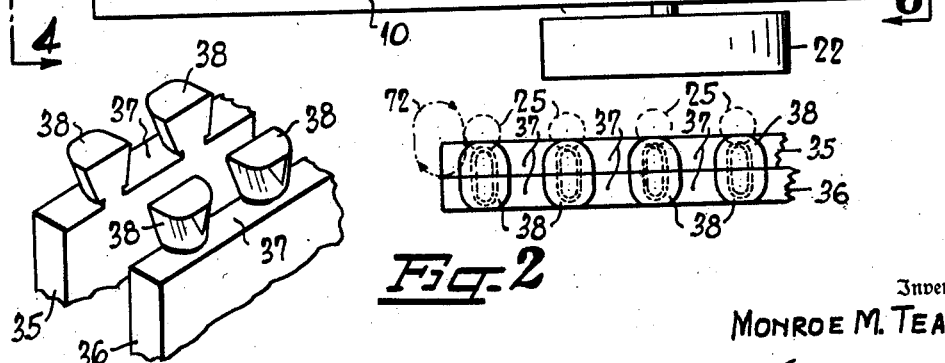
Inventor:
MONROE M. TEAGUE
By Eaton & Brown
Attorneys

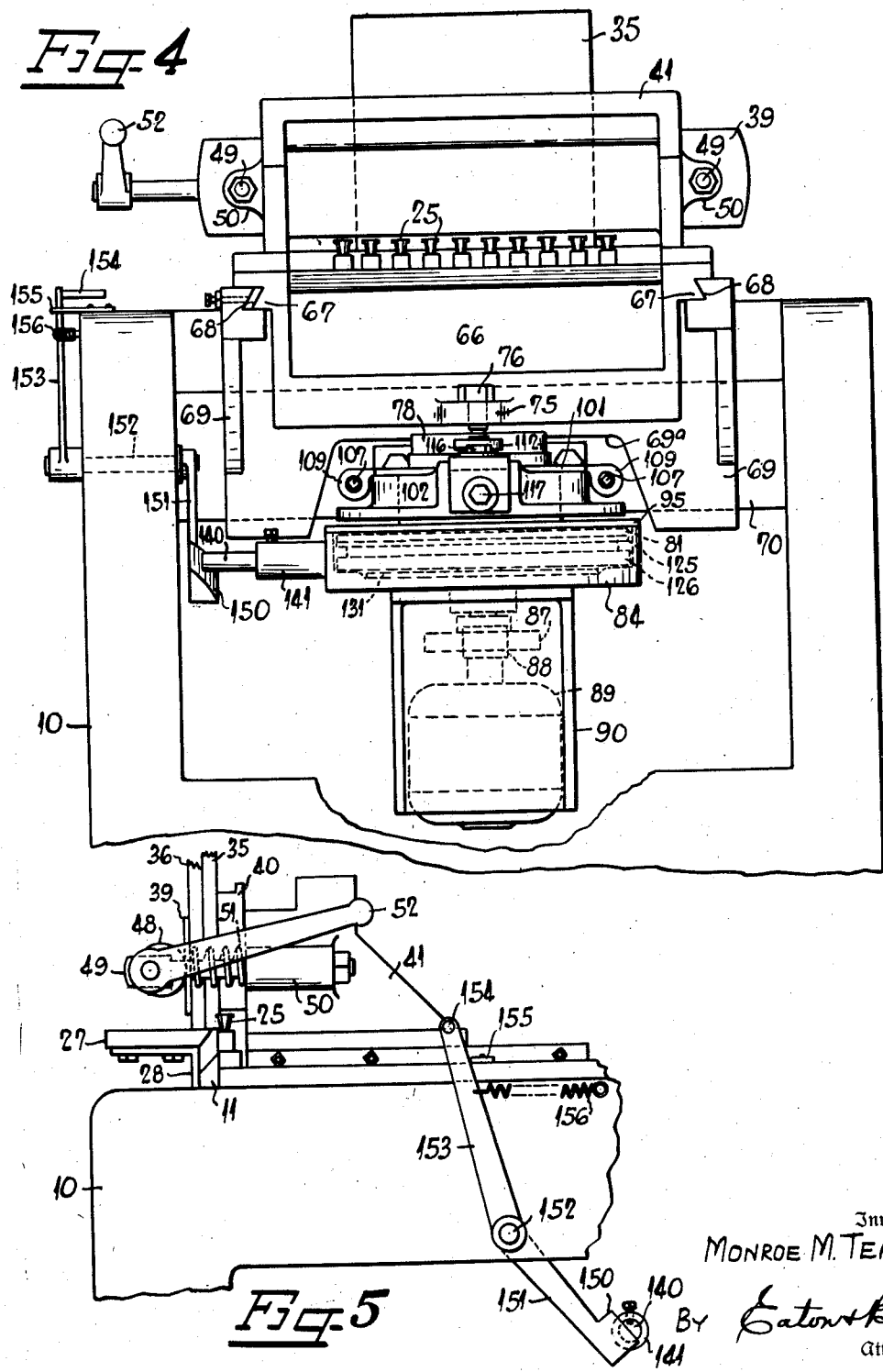

Oct. 20, 1942.  M. M. TEAGUE  2,299,602
DOVETAILING MACHINE
Filed June 17, 1940    4 Sheets-Sheet 3
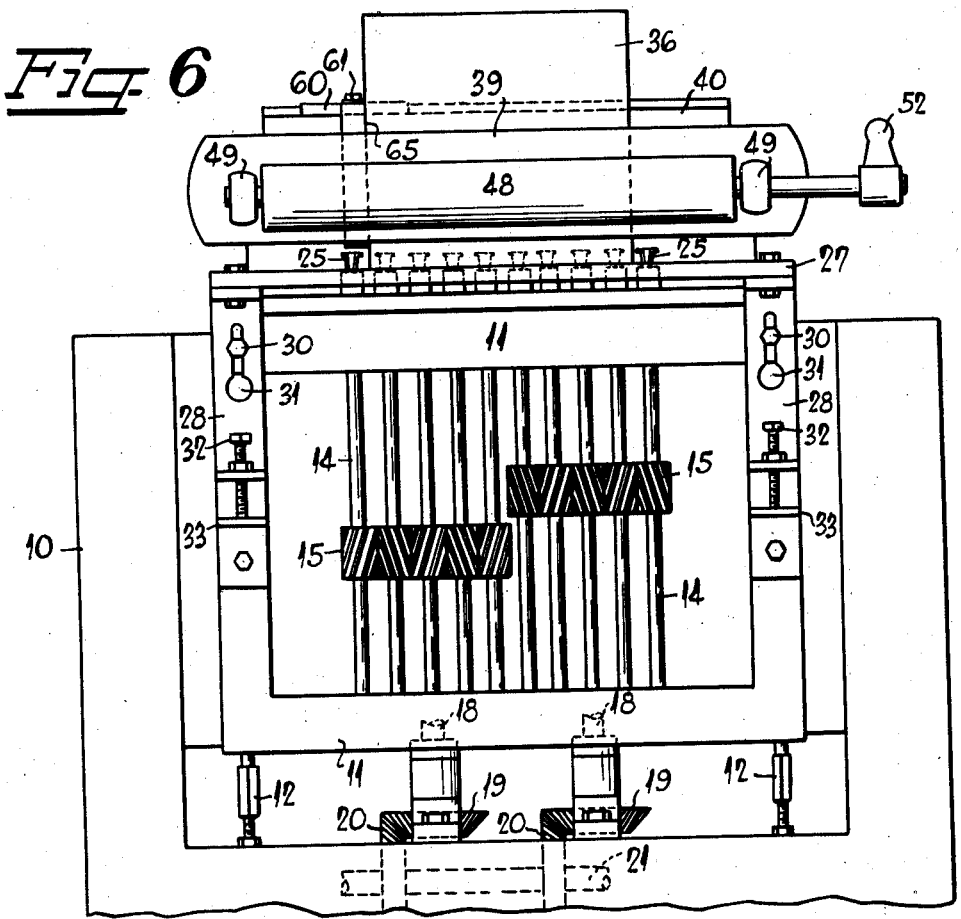
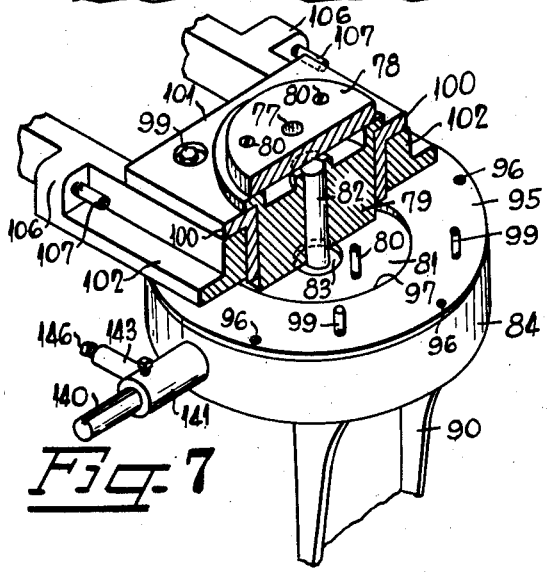
Inventor:
MONROE M. TEAGUE
By Eaton + Brown
Attorneys

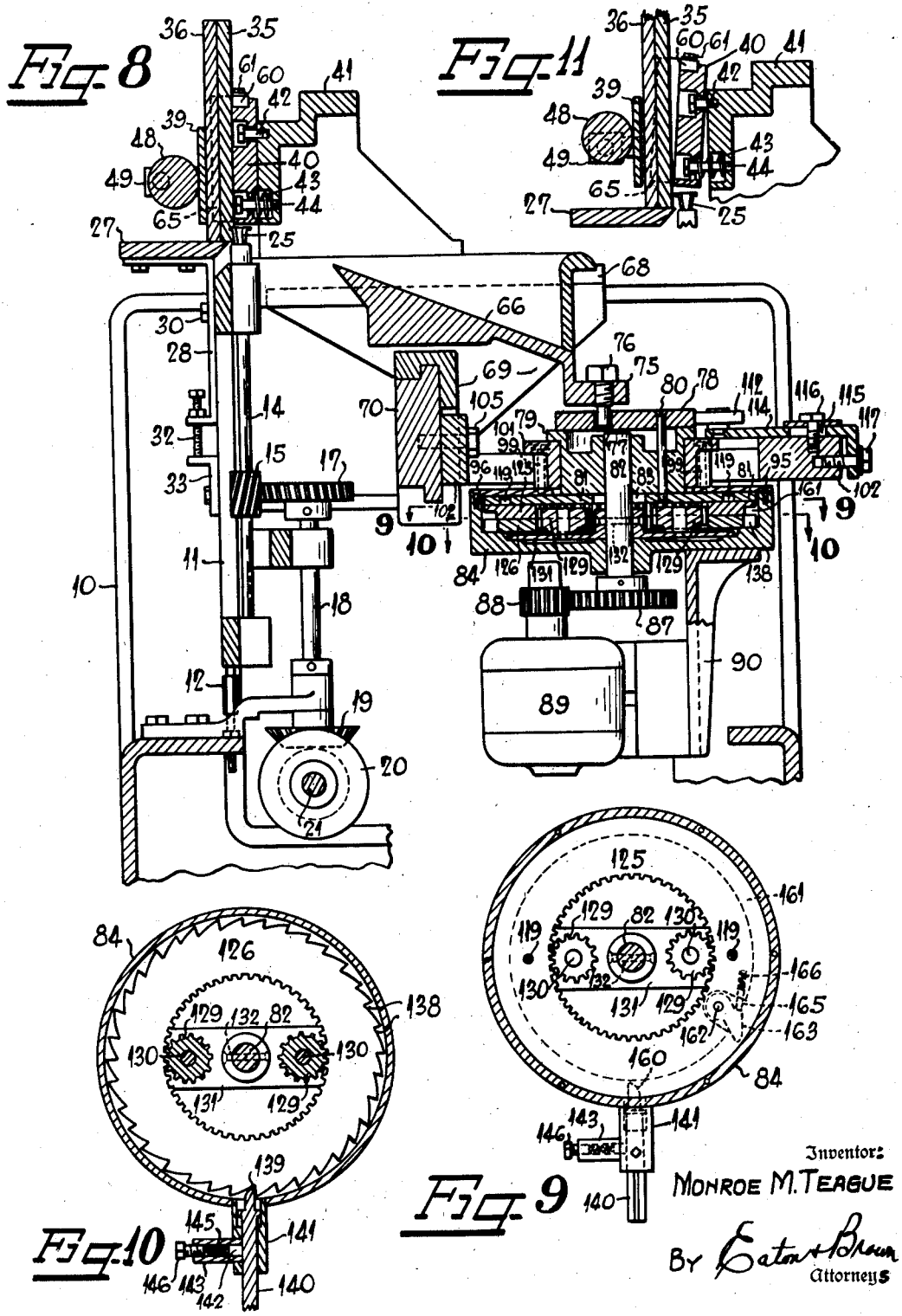

Patented Oct. 20, 1942

2,299,602

UNITED STATES PATENT OFFICE 2,299,602

DOVETAILING MACHINE

Monroe M. Teague, Lenoir, N. C.

Application June 17, 1940, Serial No. 340,973

10 Claims. (Cl. 144—87)

This invention relates to a woodworking machine and more especially to a mechanism which is adapted to cut tenons in the edges of boards. The tenons fit into the mortises in a companion member to form a joint. Mortises and tenon joint construction is especially useful in furniture manufacturing where it is highly essential that the mortises and tenons fit accurately together so that it will not be necessary to fill in the irregularities due to a misfit with wax, putty or the like.

Heretofore, apparatus has been designed for cutting mortises and tenons in the edges of materials for this purpose, but due to the fact that a high degree of mechanical skill was necessary to properly guide the material about the cutting members, this type of machine has been to a great extent unsatisfactory.

The present invention is designed to cut only the male tenon with the mortises therebetween. The mating edge, which fits into this piece, is cut in the usual manner by another machine. Also the present machine is designed to receive two blanks or boards for cutting the mortises and tenons in the edges thereof simultaneously. These boards are clamped together, after which they are positively rotated in a non-variable path about the cutting members so that every mortise and tenon will be cut in exactly the same manner. By providing two boards adjacent each other, fraying of the edges will be largely eliminated, because the boards or workpieces will travel in a complete orbit, thereby preventing the cutting tools from abruptly leaving the wood.

It is therefore, an object of this invention to provide a woodworking machine which has a table mounted thereon for universal movement in a horizontal plane, which table is adapted to carry a workpiece and cause it to travel in a closed orbit about cutting tools for cutting mortises and tenons in the workpiece.

It is another object of this invention to provide an apparatus of the class described which has a carriage for confining the workpiece preparatory to moving the same into engagement with the cutting tool and which has means for normally pressing the confined workpiece out of engagement with the cutting tool. Further means are provided for clamping the workpiece and for simultaneously moving the same into engagement with the cutting tool, whereby the workpiece is initially set to the cutters before the cutting operation is begun.

It is another object of this invention to provide an apparatus of the class described comprising a carriage for rotating a workpiece in a predetermined closed orbit about a cutting tool and having positive non-variable means for guiding the workpiece in said orbit.

This positive, non-variable means in the present instance, comprises a cam which is so mounted that the workpiece carried by the carriage will be caused to travel in one path only, thereby causing each and every tenon to be cut exactly alike. Means are also associated with the present invention for automatically stopping the carriage and the workpiece after a revolution has been made to cause tenons in the workpiece to be cut. This is a very important feature, because the machine should be stopped exactly in position for beginning the next cutting operation on succeeding workpieces. In other words, this automatic stopping feature eliminates the necessity of manually re-setting the machine to starting position.

Some of the objects of the invention having been stated, other objects will appear as the description proceeds when taken in connection with the accompanying drawings, in which—

Figure 1 is a plan view of my improved woodworking apparatus;

Figure 2 is an edge view of a pair of boards in which mortises and tenons have been cut with the woodworking apparatus shown in Figure 1;

Figure 3 is an isometric exploded view showing the edge of the boards in Figure 2, with the tenons and mortises cut therein;

Figure 4 is an elevation taken along the line 4—4 in the Figure 1;

Figure 5 is an elevation taken along the line 5—5 in Figure 1;

Figure 6 is an elevation taken along the line 6—6 in Figure 1;

Figure 7 is an isometric sectional detail view taken along the line 7—7 in Figure 1, showing the clutch and gear reducing arrangement for driving the woodworking carriage;

Figure 8 is a vertical sectional view taken along the line 8—8 in Figure 1;

Figure 9 is a sectional plan view taken along the line 9—9 in Figure 8, through the clutch and gear reducing arrangement for driving the carriage cam;

Figure 10 is a sectional plan view taken along the line 10—10 in Figure 8 showing other portions of the clutch and gear reduction mechanism for the carriage cam.

Figure 11 is a sectional view similar to the upper left-hand portion of Figure 8 but showing the workpieces confined in an unclamped noncontacting position relative to the cutting members.

Cutter driving mechanism

Referring more specifically to the drawings, the numeral 10 denotes a suitable framework of a wood-working machine having the frame 11 adjustably mounted therein by means of bolts 12 (Figures 6 and 8). This frame has a plurality of vertically disposed shafts 14 rotatably mounted therein, each of said shafts having a spiraled pinion or gear 15 thereon. It will be noted by observing Figure 6 that the pinions 15 intermesh with each other and that the adjacent pinions have oppositely pitched teeth therein, which will cause adjacent shafts to rotate in opposite directions. In the present showing, two sets of meshing pinions, embodying five for each set are shown. However, it is to be understood that any number of sets may be employed, depending upon the size of the machine and the number of workpieces under construction.

One of the pinions 15 in each set is adapted to mesh with a suitable gear 17 on the upper end of a shaft 18, the lower end of shaft 18 having a beveled gear 19 fixed thereon which, in turn, meshes with a beveled gear 20 on a drive shaft 21. Drive shaft 21 is rotatably mounted in the framework 10 and has a driving pulley 22 on one end thereof. The upper end of each of the shafts 14 has a cutting tool 25 fixed thereon. As the shaft 21 rotates, rotary movement is transmitted to the shafts 14 and the associated cutting tools 25 by virtue of the spiraled gears 15, pinion 17, shaft 18, and beveled gears 19 and 20.

Workpiece carriage mechanism

A table member 27 is positioned adjacent the cutting tools 25. This table is supported by U-shaped brackets 28 (Figures 6 and 8), which, in turn, are secured to the frame 11 by means of a bolt 30, said bolt being adapted to penetrate a slot 31 in the U-shaped member 28. An adjustment screw 32 is provided, which screw is threadably secured in one leg of the U-shaped member 28 and has its lower end abutting an angle member 33 secured to the frame 11. When it is desired to adjust the height of the table member 27, it is only necessary to manipulate the bolts 30 and 32.

The upper surface of the table member 27 is adapted to support the lower edges of boards or workpieces 35 and 36, in which mortises 37 are cut, leaving tenons 38 in the manner shown in Figures 2 and 3 in a cutting operation. When the workpieces 35 and 36 are first placed upon the table member 27 they occupy a position shown in Figure 11, and in this position the workpieces are confined but not clamped between plate members 39 and 40. A plate member 40 is loosely secured to a carriage casting 41 by any suitable means such as a stud bolt 42. The lower end of plate member 40 is normally pressed away from the vertical face of the carriage casting 41 by means of suitable compression springs 43, which springs encircle the intermediate portion of stud bolts 44. These stud bolts penetrate bores in the lower edges of the plate 40 and the springs 43 normally force this lower edge against the head of the bolts. In other words, when the springs 43 are expanded as shown in Figure 11, the cutting tools 25 are covered by the lower edge of the plate 40 and therefore the workpieces 35 and 36 cannot engage these cutting tools. However, when the plate member 39 is pushed to the right in Figure 11 to clamp the boards 35 and 36 against the face of plate member 40, then the plate member 40 will be pushed to the right in a parallel or vertical position, thereby compressing the springs 43 and at the same time moving the lower edge of the board 35 into contact with the cutting tools 25 to the position shown in the upper portion of Figure 8. This movement will set the workpiece 35 and its companion workpiece 36 to the cutting tools so that the initial entry of the cutters will be made.

The means for clamping the plate 39 against the workpiece 36 comprises an eccentric roller or shaft 48, which shaft has its restricted ends rotatably mounted in the ends of the rods 49, said rods having their other ends anchored in bosses 50 of carriage casting 41. Suitable compression springs 51 are disposed around the bolts 49 between the bosses 50 and the plate 39. Also a handle 52 is provided on the end of the eccentric shaft 48 for the manipulation of the clamping means. When it is desired to clamp the plates 39 firmly against the workpiece 36 and thereby force the companion workpiece 35 and the plate 40 to a vertical position as shown in Figure 8, it is only necessary to turn the handle 52.

Workpiece gauge

In order to properly position the workpieces 35 and 36 laterally of the framework between plates 39 and 40, a suitable L-shaped guide or stop 60 has been provided. This stop 60 is adapted to be adjustably secured on the top edge of the plate 40 by means of a stud bolt 61, said stud bolt penetrating a slot 62 in the horizontal leg portion of stop 60 and having its lower end threadably embedded in one of the spaced holes 63 in the top of the plate 40. The stop 60 has a depending leg portion 65 against which the vertical side-edges of the workpieces 35 and 36 are adapted to rest. Before the workpieces are inserted between the plates 39 and 40, the stop 60 is adjusted to the proper position so that each of the cutters 25 will engage the workpieces at the proper position when the cutting of the mortises and tenons is effected. The purpose of providing a series of holes 63 is to allow a greater latitude of adjustment. It is obvious that one or more brackets 60 may be employed. Also one or more sets of boards or workpieces 35 and 36 may be placed in between the plates 39 and 40 for simultaneous operation. In the present instance only one set of boards and only one stop is shown.

Carriage

The carriage casting 41 which supports the workpieces 35 and 36 is in turn mounted upon a base or table member 66. This base member has dove-tailed portions 67 integral with its opposed sides which fit into dove-tailed grooves 68 in an apron member 69, said apron member 69 being slidably mounted for transverse movement of the framework 10 upon a cross piece 70. The dove-tailed connection designated by reference characters 67 and 68 permits longitudinal sliding movement of the carriage casting 41 and base 66 relative to the framework of the machine, and the cross pieces 70 and the apron 69 permit the transverse movement. It is therefore, seen that the workpieces, when properly clamped between plates 39 and 40, can be moved universally in a horizontal plane relative to the stationary cutting tools 25. The path or orbit travelled by the workpieces 35 and 36 is shown by dot-dash line designated by reference character 72 in Figure 2.

It is very desirable that the path of travel of the workpieces 35 and 36 be followed exactly so that the tenons 38 and mortises 37 in the edges of the workpieces will be cut identical and precise. In other words, positive, non-variable means for guiding the workpiece in a predetermined orbit about the cutting tool must be provided. Heretofore, tables have been universally mounted for carrying a workpiece similar in many respects to the above described mechanism, but so far as I am aware none have provided a non-variable positive guiding means for directing the workpiece to travel through a predetermined orbit, as has been provided in this case.

*Workpiece and carriage moving mechanism*

The base member 66 has a horizontally disposed lug 75 integral therewith, which lug is threadably penetrated by a bolt 76. This bolt has a smooth tip on its lower end which penetrates a hole 77 (see Figure 7) in cam member 78. The periphery of the cam member 78 is such that the proper longitudinal movement of the base member 66, carriage casting 41 and the clamped workpieces will be imparted during a revolution. This cam 78 is fixedly secured to a rotary cylinder member 79 by any suitable means such as bolts 80, said bolts being adapted to penetrate the cam 78 and the member 79 and to have their lower ends secured in a plate member 81 resting directly beneath the member 79 (see Figure 8). The cylindrical member 79 is loosely mounted around the upper end of a shaft 82 and this shaft 82 projects downwardly through a hole 83 in the plate 81, just described, and also through the central portion of housing 84. The lowermost projecting end of the shaft 82 has a gear 87 fixedly mounted thereon which gear meshes with a pinion 88 of motor 89, said motor, in turn, being mounted on a bracket 90 and this bracket is supported by the lower face of housing 84. Housing 84 has a cover 95 secured thereon by means of screws 96. The central portion of the cover has an enlarged hole 97 therein, which hole is concentric with the shaft 82 and the hole 83 in the plate 81 immediately therebelow. The cover 95 is threadably engaged by the lower ends of suitable bolts 99. These bolts extend upwardly through a casting 101, said casting having suitable flanges 100 integral with opposed sides thereof which rest upon a bracket 102. It is therefore seen that as the cam 78 rotates from the high side to the low side or vice versa, that the casting 101 together with the parts therebelow will move back and forth longitudinally an amount corresponding to the difference between the radii from the center of the shaft 82 to the high and low sides of the cam.

It will also be noted that the bolt hole 77 is placed off-center relative to the drive shaft 82; consequently, as the cam 78 is rotated, the base member 66, together with the apron member 69 will be moved transversely of the machine on cross piece 70, thereby giving transverse movement to the work pieces 35 and 36 at the same time longitudinal movement is imparted.

The bracket 102 is secured to the central portion of the cross piece 70 by any suitable means such as stud bolts 105. Extending from opposed sides of the stationary bracket 102 are lugs 106 in which the ends of bolts 107 are threadably secured. The bolts extend horizontally and are adapted to slidably penetrate another set of lugs 109 which are integral with the casting 101. Disposed upon bolts 107 and between the lugs 109 and the lugs 106 are suitable compression springs 110, these compression springs normally tending to force the cam 78, member 79 and casting 101 to the left in Figure 1, against a stationary roller 112.

The roller 112 is secured on the horizontal leg of an angle member 114. This same horizontal leg has a slot 115 therein which is penetrated by a stud bolt 116 and this bolt has its lower end threadably secured in the bracket 102. The vertical leg of the angle member 114 is penetrated by stud bolt 117 which likewise has its end threadably secured in the bracket 102. When it is desired to adjust the position of the carriage and clamped workpiece relative to the cutters 25, the screws 116 and 117 are manipulated to perform this adjustment. Adjustment of the compression offered by springs 110 can be effected by the manipulation of the nuts 107a which are threadably secured around the bolts 107. These nuts serve to confine one end of each compression spring 110 whereas the lugs 109 serve to confine the other ends.

By observing Figure 4, it will be seen that the apron portion 69 is cut away as at 69a a sufficient amount to allow transverse reciprocation of the apron member on the cross-piece 70 without engaging the bracket 102 which is secured to the same cross piece.

It will be noted by observing Figures 7 and 8, that the cylindrical member 79 and the cam 78 are not directly secured to the shaft 82 because the upper end of shaft 82 is rotatably mounted within the cylindrical member 79 and the upper end of the shaft terminates short of the cam 78. The shaft 82, however, is connected to the cam 78 indirectly by means of a train of gears which will be presently described.

As heretofore stated, the plate 81 in the housing 84 is secured to the members 78 and 79 by means of bolt 80. This cylindrical plate member 81 has suitable bores therein which are loosely penetrated by pins 119, said pins projecting upwardly from a circular internal gear plate 125. This gear plate rests upon another gear plate 126 immediately therebelow and the teeth of both of the gears 125 and 126 are adapted to simultaneously mesh with pinions 129, these pinions being rotatably mounted upon studs 130 which extend upwardly from a plate yoke 131. The plate yoke 131 is disposed directly below the internal gear plate 126 and is fixedly secured as at 132 to the shaft 82. It should be stated that the internal gear 125 has a different number of teeth therein than the gear 126 therebelow; consequently when the lowermost gear segment 126 is held in stationary position and when the shaft 82 is set in motion to rotate the pinions 129, the top gear will be caused to rotate slowly as a result. As soon as the top gear begins to rotate, the plate 81, bolts 80, cylindrical member 79 and cam 78 will simultaneously begin to rotate, thereby imparting universal movement in a horizontal plane to the workpiece clamping means therebefore.

*Starting and stopping mechanism*

On the other hand, when it is desired to stop the rotation of the cam 78, it is only necessary to release the bottom gear 126 at which time the top gear 125 will be held in stationary position due to the friction offered by the parts of the machine operated thereby and the bottom gear will be caused to rotate. Since the bottom gear is not secured to the cam 78 in any manner, its rotation will not affect the operation of the machinery and as a result the carriage and workpieces will remain stationary.

In order to hold the lower gear 126 in a stationary position to cause the cam 78 to rotate, this gear has been provided with suitable notches or teeth 138 in its periphery. These teeth are adapted to be engaged by a wedge shaped end 139 which forms a part of a plunger 140, said plunger being slidably mounted in a pipe 141 and this pipe communicates with the interior of the housing 84 (see Figure 10). The periphery of the plunger 140 is engaged by a friction member 142 in a pipe 143. Also disposed in the pipe 143 is a spring 145 which normally presses the friction member 142 in engagement with the member 140. The resistance offered by the friction member 142 may be varied by a set screw 146 which is threadably secured in the pipe 143 and which applies pressure to the spring, and the spring, in turn, applies pressure to the friction member.

Shaft 140 extends outwardly from the pipe member 141, and the end thereof is adapted to be engaged by a cam member 150 on the lower end of a lever 151. This lever is fixedly secured on a shaft 152 said shaft also having an upwardly extending lever 153 fixed thereon with a handle 154 on the upper end of the lever. A spring 156 normally tends to rotate the cam member 150 out of engagement with the projecting end of shaft 140. Stop member 155 limits the clockwise rotation of these levers.

When it is desired to start the machine, it is necessary to rotate the cam member 150 toward the observer in Figure 4, or in counterclockwise manner in Figure 5, thereby causing this cam member to push the shaft 140 inwardly toward the housing 84. This movement, in turn, will cause the pointed end 139 to engage teeth 138 in the periphery of the lower internal gear 126.

It should be stated here that the function of the two internal gears and the pinions 129 is to effect a gear reduction between the motor 89 and the cam 78 and also to provide a simple clutch arrangement. Cam 78 should rotate relatively slow in comparison to the high speed of the electric motor 89 and hence this type of gear reduction is employed.

When successive sets of workpieces are being rapidly cut by the above-described invention, it is highly important that the machine be automatically stopped exactly in the right position when the workpieces have travelled the path of a closed orbit. To effect this automatic stopping, it is necessary to withdraw the plunger point 139 and the shaft 140 from engagement with the teeth 138 in the lower gear 126. Integral with the shaft 140 and directly above the plunger point 139 is a second beveled point 160, said point being adapted to project inwardly substantially the same distance as the point 139. This beveled point is turned in the opposite direction from the beveled surface on the point 139, and is disposed, when pushed inwardly, in a suitable groove 161 cut in the lower periphery of the internal gear 125. The gear plate 125 has pivoted therein as at 162 a dog 163 said dog having its point also extending into the groove 161. A plunger 165 engages the back side of the dog 163 and this plunger is normally pressed against this dog by means of a spring 166. With the free end of the dog 163 disposed in the groove 161, it is seen that as the gear 125 rotates that this dog 163 will engage the beveled projecting end 160 and force the shaft 140 outwardly and at the same time, the point 139 will be disengaged from the teeth 138 in the gear 126 therebelow. With both of the internal gears disengaged, the lower gear will start rotating and the upper gear, to which the cam 78 is attached, will remain stationary. At the time the dog 163 engages the point 160 to stop the cam 78 from rotating, the workpieces 35 and 36 will have completed their travel of the orbit. Therefore, the carriage and clamping means will be stopped in the proper position for the beginning of a cutting operation upon the next succeeding pair of workpieces.

It is, therefore seen that a positive non-variable means has been provided for forming the tenons 38 simultaneously by cutting the mortises 37 therebetween in the workpieces 35 and 36. If it is desired to change the type or size of tenons and mortises in the workpieces, it is only necessary to remove the cam 78 and replace it with the desired cam. This type of construction makes the machine fully automatic after the workpieces have once been clamped in position for cutting. It also insures that each and every workpiece will be cut in an identical manner without depending upon any degree of mechanical skill for performing a first-grade piece of workmanship.

In the drawings and specification there has been set forth a preferred embodiment of the invention and although specific terms are employed, they are used in a generic and descriptive sense only and not for purposes of limitation, the scope of the invention being set forth in the claims.

I claim:

1. A woodworking machine for cutting mortises and tenons in a workpiece, comprising a base, a table mounted for movement on the base in any direction in substantially a horizontal plane, rotary cutting tools mounted in a stationary position adjacent said table, means for loosely confining a workpiece preparatory to moving the same into engagement with the cutting tools, spring means for normally urging said workpiece out of engagement with the cutting tools, and means for clamping the workpiece and for simultaneously moving the same into engagement with the cutting tools whereby the workpiece is initially set to the cutting tools so that the initial entry of the cutters will be made while the cutting tools are in stationary position, and prior to cutting the mortises and tenons.

2. A woodworking machine for cutting mortises and tenons in a workpiece, comprising a base, a table mounted for movement on the base in any direction in substantially a horizontal plane, rotary cutting tools mounted in a stationary position adjacent said table, means for loosely confining a workpiece preparatory to moving the same into engagement with the cutting tools, resilient means for normally urging said workpiece out of engagement with the cutting tools, means for clamping the workpiece and for simultaneously moving the same into engagement with the cutting tools whereby the workpiece is initially set to the cutting tools prior to cutting the mortises and tenons, positive non-variable means for guiding the workpiece in a predetermined orbit about the cutting tools, and means for automatically stopping said guiding means after the orbit has been traveled by the workpiece.

3. A device of the character described comprising a base, a connecting member, a table, means for slidably mounting the table upon the connecting member whereby reciprocating movement is obtained, means for slidably mounting the connecting member upon the base whereby reciprocating movement is had, such movement being substantially at right angles to the path of the aforesaid movement, a revolving cutter mounted on the base, clamping means on said table adapted to receive and maintain pieces of wood or the like above the plane of movement of the table, a positive non-variable means for guiding the workpiece in a predetermined orbit about said cutter, said guiding means including a driven shaft, an eccentric cam mounted on said shaft with one side of its periphery engaging the stationary base, and a connection eccentric to said shaft between said cam and said table.

4. A woodworking machine for cutting mortises and tenons in a workpiece comprising a base, a table mounted for movement on the base in any direction in a substantially horizontal plane, rotary cutting tools mounted in a stationary position adjacent said table, clamping means on said table to receive the workpiece to be acted upon and to hold it in the plane of the cutting tools, positive non-variable means for guiding the workpiece in a predetermined orbit about the cutting tools, said guiding means including a driven shaft, an eccentric cam mounted on said shaft with one side of its periphery engaging the stationary base, and a connection eccentric to said shaft between said cam and said table.

5. A woodworking machine for cutting mortises and tenons in a workpiece comprising a base, a table mounted for movement on the base in any direction in substantially a horizontal plane, rotary cutting tools mounted in a stationary position adjacent said table, clamping means for said table to receive a workpiece to be acted upon and to hold it in the plane of the cutting tool, a motor slidably mounted in said machine for movement toward and away from said cutting tools, cam means driven by said motor and engageable with said table and with said machine, whereby the table will be moved toward and away from the cutting tools, and an eccentric connection between the axis of rotation of said cam and said table whereby the table is simultaneously moved transversely of the path of said first-named movement.

6. In a dovetailing machine, a base, a pair of frames mounted one upon the other for sliding movement along a trackway disposed at right angles to each other, said frames being supported by said base, a plurality of rotary cutting tools, means on one of the frames for holding the workpiece, a motor slidably mounted on the other frame, and means driven by the motor and operatively engaging the frame for moving the pieces of wood in a closed orbit around the cutters, said frame engaging means including a driven shaft, an eccentric cam mounted on said shaft with one side of its periphery engaging the base, and a connection eccentric to said shaft between said cam and said table.

7. In a machine for simultaneously cutting mortises and tongues on the ends of two pieces of material and provided with a table slidable longitudinally of the machine, a second table mounted on the first table for sliding movement at right angles to the direction of sliding movement of the first table, a plurality of vertically disposed spaced cutting tools, means on the second table for supporting the two pieces of material, a motor slidably mounted on said machine for movement toward and away from said cutting tools, cam means driven by said motor and engageable with said machine and with said second table, whereby said second table will be moved toward and away from said cutting tools and an eccentric connection between the axis of rotation of said cam and said second table whereby the table is simultaneously moved transversely of the path of said first-named movement.

8. A woodworking machine for cutting mortises and tenons in a workpiece comprising a base, a table mounted for movement on the base in any direction in a substantially horizontal plane, rotary cutting tools mounted in a stationary position adjacent said table, clamping means on said table to receive the workpiece to be acted upon and to hold it in the plane of the cutting tools, a motor slidably mounted on said machine for movement toward and away from said cutting tools, a shaft driven by said motor, a rotatable pinion bodily rotatable about said shaft, a pair of superposed rotatable gears having substantially the same pitch diameter but having a different number of teeth therein, both of said gears being adapted to mesh with said pinion as it bodily rotates, cam means connected to one of said gears and being engageable with said table and with said base, means for releasably holding the other of said gears stationary, whereby the table will be moved toward and away from the cutting tools and an eccentric connection between the axis of rotation of said cam and said table and whereby the table is simultaneously moved transversely of the path of said first-named movement.

9. A woodworking machine adapted to cut mortises and tenons in workpieces comprising a stationary revolving cutter, a table slidably mounted for movement toward and away from said cutter, a plate having its upper portion pivotally secured to said table above the cutter and having its free lower end terminating adjacent but above said cutter, spring means for urging the free end of said plate away from said table, and means for clamping a workpiece against one face of said plate and for simultaneously moving the free end of the plate toward said table to thereby press one edge of the workpiece against said cutter.

10. A woodworking machine for cutting mortises and tenons in a workpiece comprising a base, a table mounted for movement in the base in any direction in a substantially horizontal plane, rotary cutting tools mounted in a stationary position adjacent said table, a plate having its upper edge pivotally secured to said table and having its free edge terminating adjacent but above said cutting tools, resilient means for urging the free edge of said plate away from said table, a clamp for holding said workpiece against one face of said plate and for simultaneously holding the free edge of the plate against the table to thereby press one edge of the workpiece against said cutting tools.

MONROE M. TEAGUE.